(12) United States Patent
Alexander et al.

(10) Patent No.: US 6,478,094 B2
(45) Date of Patent: Nov. 12, 2002

(54) HYDRAULIC THREE POINT TRACTOR HITCH

(76) Inventors: Frank David Alexander, 121 Martin School Rd., Pickens, SC (US) 29671; James Alfred Tomlinson, 310 Belfast La., Pickens, SC (US) 29671

( * ) Notice: Subject to any disclaimer, the term of this patent is extended or adjusted under 35 U.S.C. 154(b) by 0 days.

(21) Appl. No.: 09/832,148

(22) Filed: Apr. 10, 2001

(65) Prior Publication Data

US 2002/0144829 A1 Oct. 10, 2002

(51) Int. Cl.$^7$ .............................................. A01B 63/10
(52) U.S. Cl. ...................................... 172/439; 172/272
(58) Field of Search ................................ 172/272, 439, 172/446–448, 450, 455; 280/456.1, 460.1

(56) References Cited

U.S. PATENT DOCUMENTS

| | | | |
|---|---|---|---|
| 2,688,865 A | 9/1954 | Foster et al. ................... | 70/129 |
| 3,312,478 A | 4/1967 | Knappi ........................ | 280/405 |
| 3,434,737 A | 3/1969 | Bailey et al. ................ | 280/461 |
| 3,561,789 A | 2/1971 | Stikelatheo et al. ......... | 280/479 |
| 3,572,759 A * | 3/1971 | Baugh ......................... | 172/272 |
| 3,977,698 A * | 8/1976 | Von Allworden ......... | 280/461.1 |
| 4,125,271 A | 11/1978 | Wiboltt et al. .......... | 280/461 A |
| 4,241,935 A * | 12/1980 | Vollmer et al. ......... | 280/461.1 |
| 4,944,354 A * | 7/1990 | Langen et al. ................ | 172/47 |
| 5,029,650 A | 7/1991 | Smit .............................. | 172/5 |
| 5,544,708 A * | 8/1996 | Braun ........................ | 172/272 |
| 5,697,454 A * | 12/1997 | Wilcox et al. ............... | 172/447 |
| 5,743,339 A | 4/1998 | Alexander, III ............. | 172/272 |
| 5,975,216 A | 11/1999 | Gibbons ..................... | 172/439 |
| 5,997,024 A | 12/1999 | Cowley ................... | 280/478.1 |

* cited by examiner

Primary Examiner—Robert E. Pezzuto
(74) Attorney, Agent, or Firm—Charles L. Schwab; Nexsen Pruet Jacobs & Pollard, LLC

(57) ABSTRACT

A three point tractor hitch permitting an implement to be attached or detached by an operator without leaving the tractor seat. The upper hitch arm includes a linear actuator with a hand grip and a hand operated switch controlling extension and contraction of the upper arm. A latching mechanism and a hand operated latch release are mounted on the upper arm facilitating attachment and release of the upper arm to an upper attaching pin of an implement hitch mast. One of the two lower arms of the hitch can be shifted laterally by a hydraulically actuated cylinder.

9 Claims, 5 Drawing Sheets

HYDRAULIC THREE POINT TRACTOR HITCH

TECHNICAL FIELD

This invention relates to a three point hitch for connecting an implement to a tractor.

BACKGROUND OF THE INVENTION

Currently available three point hitch systems require two people to connect implements to a tractor. One person drives the tractor and one person on the ground attaches the two lower arms which require a precise alignment. With two people, one hitch arm can be attached and then with a slight forward or backward movement of the tractor, the other arm is attached. For one person to attempt to attach a tractor to a three point hitch implement, the task becomes onerous requiring a lot of back and forth movement of the tractor and much mounting and dismounting to and from the tractor seat. With one hitch arm attached and one hitch arm loose, hitching can become very dangerous should the tractor move and the operator get caught between the tractor and the implement.

The upper center arm is just as precise to attach as the two lower arms. It has to be readjusted in length every time a different implement is used. This becomes very time consuming because typically it is extended and retracted by manually screwing a turnbuckle in or out.

Efforts to solve these problems have resulted in a variety of aftermarket designs which require the purchase and use of an additional intermediate devices that are attached to the tractor to facilitate its connection with various implements.

U.S. Pat. No. 2,688,865 discloses a hand operated hydraulic lock for locking the trunk compartment of a motor car and is it not applicable to a attachment of implements to a tractor.

U.S. Pat. No. 3,312,478 is a very complex intermediate device with many moving parts and chains and offers as much of a attaching problem as those presented by conventional implement hitches.

U.S. Pat. No. 3,434,737 offers an intermediate hitching device with an excessive number of parts requiring manual adjustment in order to hitch an implement to a tractor.

U.S. Pat. No. 3,561,789 solves part of the problems of attaching tractor to implement but still uses a hitch adaptor as an additional device between tractor and the implement and is of a complex design.

U.S. Pat. No. 4,125,271 relates to a tool suspension for either front or rear mounting of tools from vehicles in the form of a three point suspension for hydraulic lifting and lowering. Front and rear mounted tools are used on motor vehicles for road maintenance, snow clearing, street cleaning and grass cutting. No adaptation was found for use with farm implements.

U.S. Pat. No. 5,029,650 discloses an intermediate frame mounted on the tractor hitch links.

U.S. Pat. No. 5,743,339 discloses a two part steel plate device. One plate is attached to the three point hitch of the tractor and the other plate is attached to the implement. Steel plate of a size and strength to accomplish the task would be very heavy. Another drawback to this system is that there are no provisions for the fore and aft adjustment of the upper link. A still further problem is a matching plate would have to be purchased for each implement used. This represents a substantial investment for the operator.

U.S. Pat. No. 5,975,215 is a low profile transferable hydraulic three point hitch designed for use on the front or rear of a truck. The truck can then be used to attach to three point implements instead of using a tractor.

U.S. Pat. No. 5,997,024 illustrates a hitching mechanism for tractors to aid in steering the implements in specific agricultural uses such as in a track laying application where both a steering function and a lateral shifting capability in needed. This is a specialized function and not needed for general use of tractors and implements.

OBJECTS AND SUMMARY OF THE INVENTION

It is an important object of the invention to provide a power operated tractor hitching system which can be readily aligned and secured to an implement without the operator leaving the tractor seat and without the use of intermediate devices.

It is a further object of the invention to provide an improved three point hitch which is economical to manufacture, permits quick attachment of the implement and provides long trouble free service.

The invention solves the problems present in prior implement hitch designs by a redesign of the tractor hitch so as to eliminate the need for intermediate hitch devices. The ends of the hitch arms are redesigned and controls added to permit the operator to hitch the tractor to an implement without dismounting from the tractor seat. The tractor is easily and quickly hitched to an implement by one person in a safe manner. The weight and expense of intermediate hitch devices is avoided.

BRIEF DESCRIPTION OF THE DRAWINGS

The invention is illustrated in the accompanying drawings in which.

DETAILED DESCRIPTION OF THE INVENTION

Figure 1:
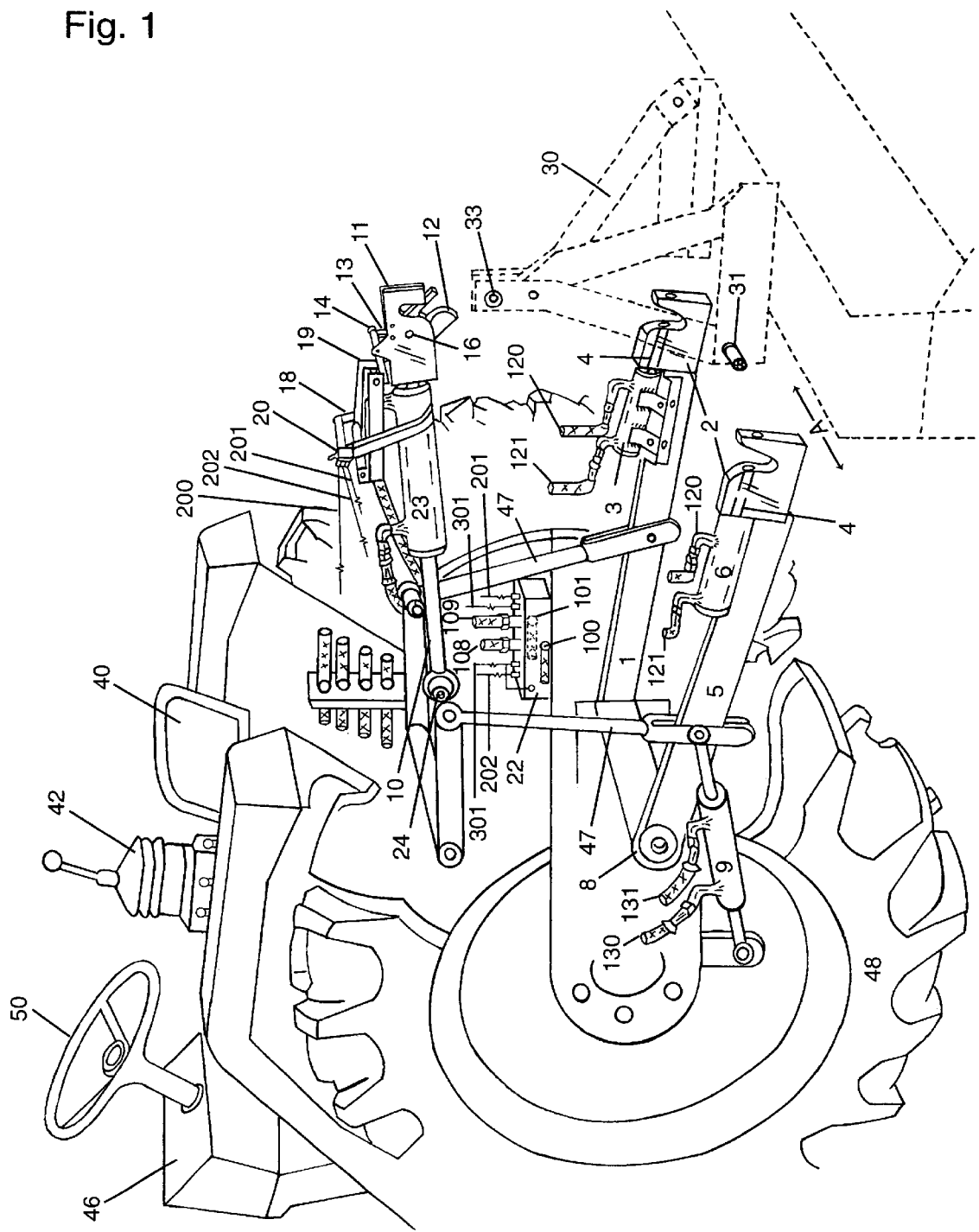
FIG. 1 is a partial perspective view of an agricultural tractor with a portion of the left wheel removed showing an embodiment of a three point tractor hitch system.
Figure 9:
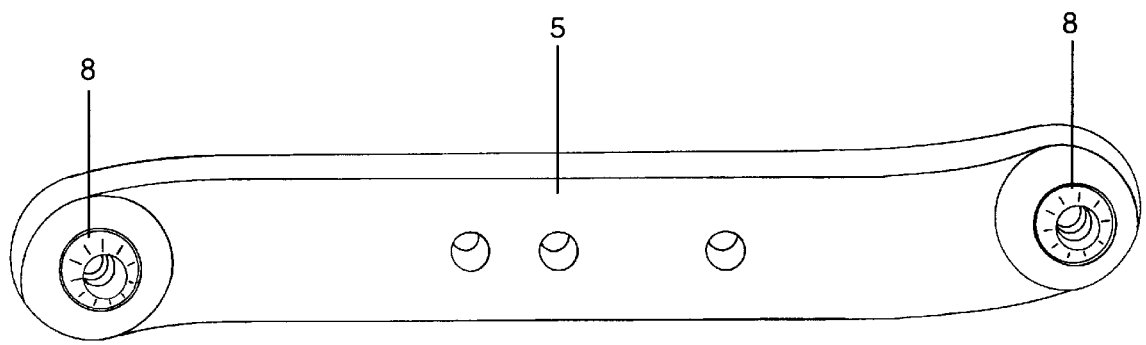
FIG. 9 is a side view of the lower arm of a standard three point tractor hitch.

Referring to FIG. 1, the forward ends of a pair of laterally spaced lower hitch arms 1, 5 are connected to an agricultural tractor 46 by a pair of ball joints 8, only one of which is illustrated. The rear ends of the lower arms 1, 5 have upwardly open jaws 2 rigidly secured thereto which are adapted to connect to pins or studs 31 on an implement 30. Thus the lower arms 1,5 differ from the standard arm shown in FIG. 9 which has a ball joint at both ends. The hitch includes an upper arm 10 which is connected at its forward end to the tractor 46 by a ball joint 24. The rear end of the arm 10 includes an upper fixed jaw 11 and an upper moveable jaw 12 which are adapted to connect to an upper pin 33 of a hitch mast on the implement 30.

The agricultural tractor 46 includes an operator's station including a seat 40 for the operator and a control system 42 with hydraulic control valve and a steering wheel 50. A portion of the left rear wheel 48 has been removed for illustration purposes.

Figure 2:
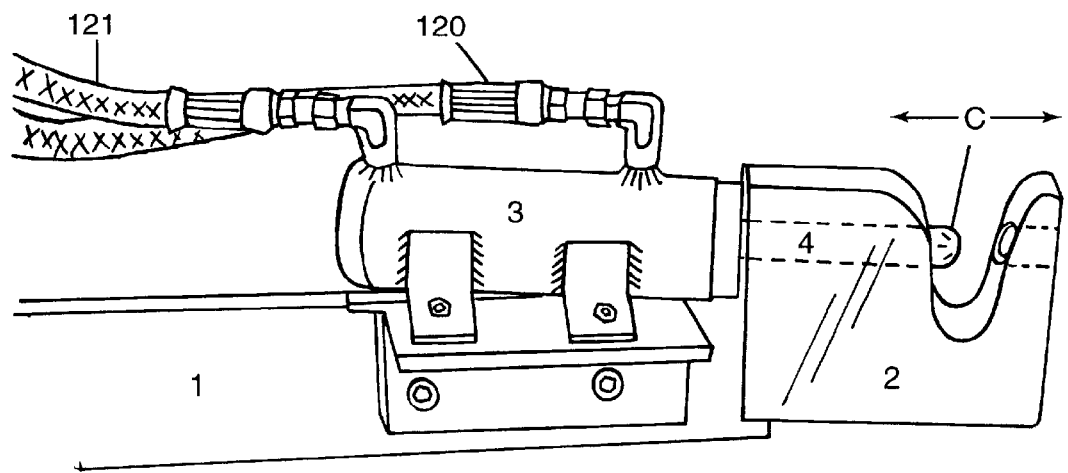
FIG. 2 is a side view of a fixed lower jaw in an open position and with a hydraulic locking shaft in a retracted position.
Figure 3:
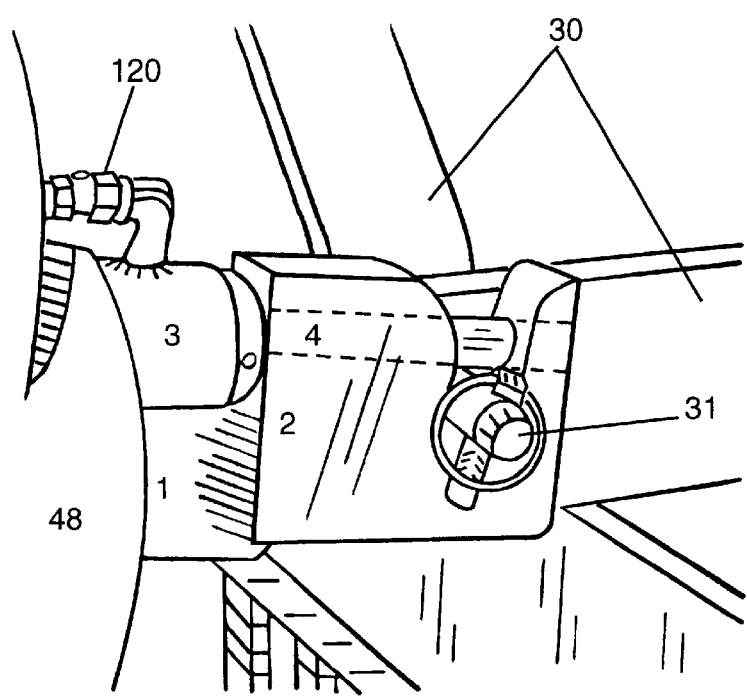
FIG. 3 is a side view of the fixed jaw with the hydraulic locking shaft extended to a closed position.
Figure 4:
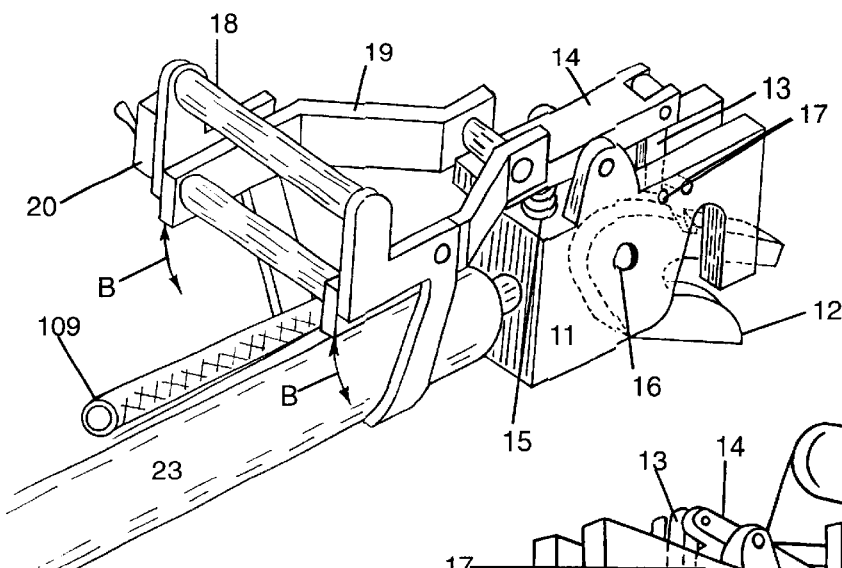
FIG. 4 is a perspective view of upper fixed and moveable jaws.

FIG. 2 shows the fixed open jaw 2, on the lower lift arm 1 with the locking shaft 4 retracted to an unlocked position in which the jaw 2 can receive the stud 31 of the implement. The mouth of the open fixed jaw 2 has sufficient width to readily enclose the lower hitch studs 31 of the implement 30. The flared width of the two fixed jaws 2 allows the operator to back the tractor 46 and attach it to the implement 30 without the tractor being in perfect alignment horizontally, vertically or laterally. In operation the fixed open jaws 1, 5 of the two lower arms 1, 5 are positioned under the lower hitch studs 31 of an implement 30. As the arms 1, 5 are hydraulically raised by a pair of tractor mounted life arms 47, the jaws 2 encompass the implement studs 31. Hydraulic cylinders 3 secured to the lower hitch arms 1, 5 are extended causing the locking shafts 4 to extend to positions above the implement studs 31 thereby locking the rear ends of the lower arms 1, 5 to the implement 30.

The lateral spacing of the implement studs 31 vary from implement to implement. To overcome this problem, a hydraulic cylinder 9 has its opposite ends attached, respectively, to the tractor 46 and to the lower arm 5. This enables the operator to change the lateral distance between the trailing ends of the arms 1, 5 to accommodate the different, lateral spacings of the implement studs 31. The opposing arm may be left in it's original position.

Figure 10:
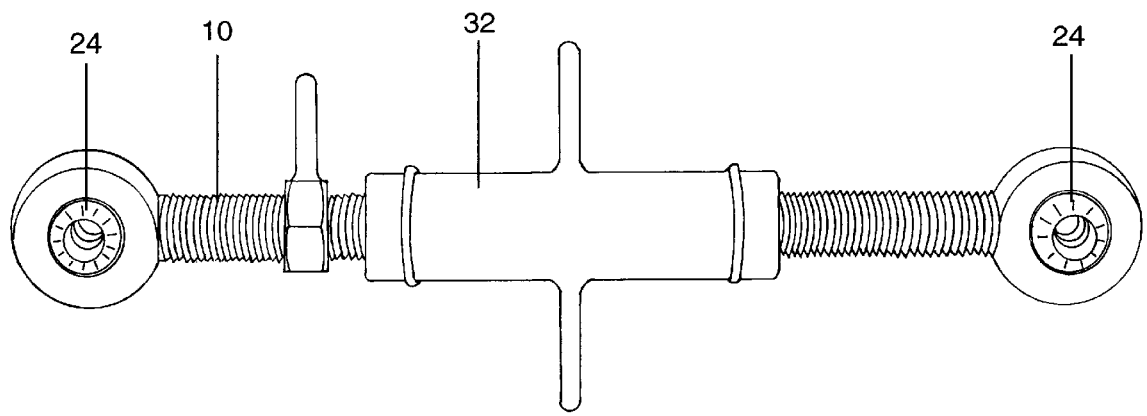
FIG. 10 is a side view of an upper center arm of a standard three point tractor hitch.

Instead of using the standard turnbuckle 32 illustrated in FIG. 10, the present invention uses a linear hydraulic actuator in the form of a hydraulic cylinder 23 which has a fixed jaw 11 and a moveable jaw 12 rigidly secured to the cylinder component of the hydraulic cylinder 23. The rod component of the cylinder 23 is connected to the tractor 46 by a ball joint 24.

The implement 30, when not in use, is almost never parked in the exact fore and aft position. The hydraulic cylinder 23 enables the operator to change the fore and aft position of the jaws 11, 12 to a proper distance to engage the upper center pin 33 on the hitch mast of the implement 30.

Figure 5:
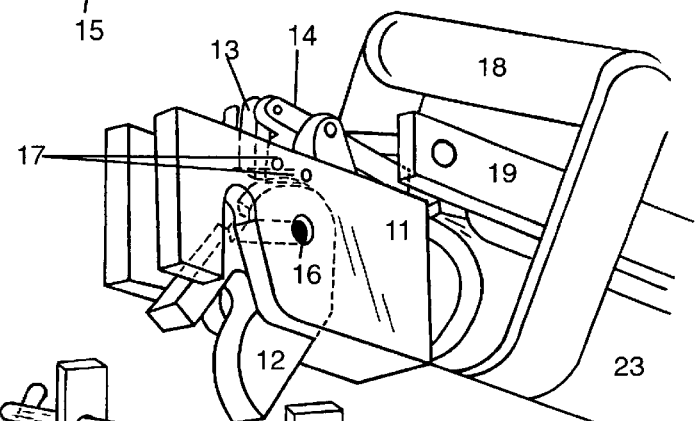
FIG. 5 is a perspective view of the upper fixed and moveable jaws being lowered to attach to a pin mounted in the upper center of an implement hitch mast.
Figure 6:
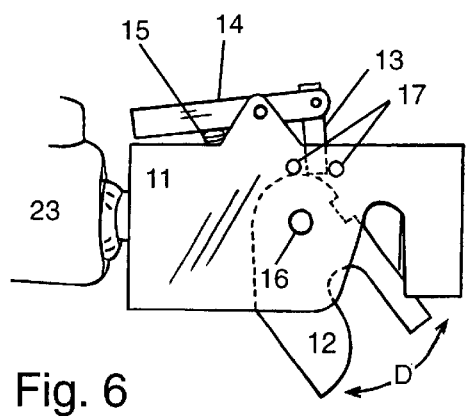
FIG. 6 is a side view showing the upper moveable jaw in an open position.
Figure 7:
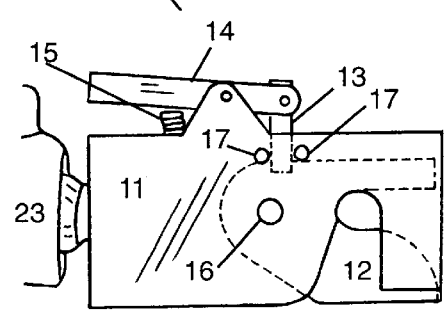
FIG. 7 is a side view showing the upper jaw in a closed position.

As shown in FIGS. 4 through 7, the downwardly open fixed upper jaw 11 is fixedly attached to the cylinder component of the hydraulic actuator 23, which constitutes the upper centrally positioned arm of the three point hitch. The moveable jaw 12 is pivotally connected by a transverse pin 16 to the fixed jaw 11. FIGS. 5 and 6 show the moveable jaw 12 in a downwardly pivoted open position in which it can receive the implement pin 33. As the rear end of the upper hitch arm 10 is lowered, the implement pin 33 engages the crotch of the moveable jaw 12 and pivots the moveable jaw 12 to a latched or locked position shown in FIG. 7 in which a latching or locking block 13 engages a complementary notch in the movable jaw 12. The latching block 13 is pivotally connected to the rear end of the latching lever 14 which in turn is pivotally connected to the fixed jaw 11. Guide pins 17 on the fixed jaw 11 guide the up and down movement of the latching block 13. The latching lever 14 is biased toward its latching position shown in FIG. 7 by a latching lever spring in the form of a coil spring 15 interposed between the fixed jaw 11 and the lever 14.

A hand grip 18 is rigidly secured to the cylinder component of the hydraulic cylinder 23 with a laterally extending hand gripable portion disposed in vertically spaced relation to and above the cylinder 23. A fore and aft extending hand operated release 19 has an intermediate part which is pivotably connected to the hand grip 18 and includes a release handle on its fore end parallel to and disposed between the gripable portion of the hand grip 18 and the cylinder 23. The aft end of the release 19 is operatively associated with the forward end of the latching lever 14 so that upward movement of the release handle of said release 19 pivots said latching lever 14 to move the latching block 13 to it's release position shown in FIGS. 4, 5 and 6.

In order to disengage the fixed and movable upper jaws 11, 12 from the upper pin 33, the operator with one hand, grasps the release handle of the latching block release 19 and the hand grip 18. By closing these handles together, the release handle 19 depresses the fore end of latching lever 14, collapsing the latching lever spring 15 and releasing the latching block 13. With the latching block 13 released from the moveable jaw 12, the operator can lift the fixed jaw and the moveable jaw 12 clear of the implement pin 33, disengaging the upper arm from the implement as shown in FIG. 5.

Figure 8:
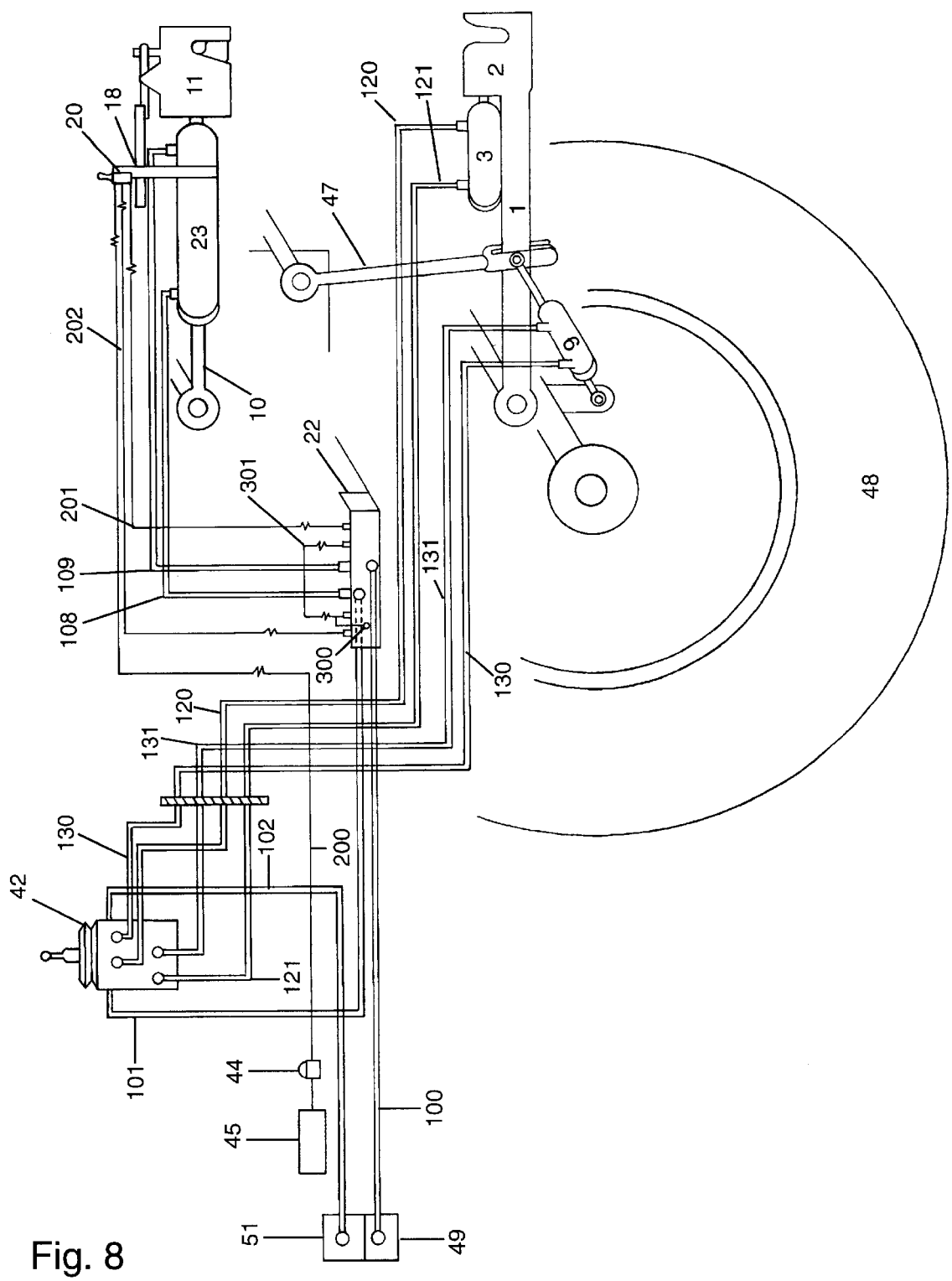
FIG. 8 is a schematic illustration of a control system for the hydraulic actuators of the three point tractor hitch.

The controls for operating the hydraulic cylinders 3, 6, 9 and 23 are shown schematically in FIG. 8 and include an electric or solenoid valve 22 mounted on the tractor which controls the actuation of the hydraulic cylinder 23 of the upper arm 10. The electric valve 22 is controlled through operation of a remote three position thumb switch 20 mounted on the hand grip 18 secured to the hydraulic cylinder 23. With one hand, an operator can adjust the length of the upper arm 10 and manoeuver the upper arm 10 and the jaws 11 and 12 into an implement attaching position with relative ease. Hydraulic fluid, under pressure, leaves a tractor hydraulic pump 49 and passes through a hydraulic hose 100 to the electric valve 22. The electric valve 22 serves as a junction box for the hydraulic fluid to be distributed either to the upper arm cylinder 23 or to the lower arm cylinders 3, 6 or to the cylinder 9. If the upper arm cylinder 23 is not being actuated the fluid passes through the electric valve 22 on to the manual control valve of the control 42 by way of a hose 101. If no cylinders are being actuated by the manual valve of the control 42 the fluid passes through the valve 42 and returns back to a tractor hydraulic reservoir 51 by a return hose 102. To actuate the upper arm cylinder 23, the electric thumb switch 20 is moved from its neutral position which opens a port in the electric valve 22 to divert fluid into either, a hose 108 or a hose 109 to retract or extend the cylinder 23.

The manual hydraulic valve of the control 42 is used to deliver fluid to cylinder 9 by way of hose 130 or 131 to extend or retract this cylinder. The manual hydraulic valve of the 42 is also used to deliver fluid to cylinders 3 and 6 by hoses 120 or 121 to extend or retract these cylinders simultaneously.

Electric current flows from a tractor coil 45 through an electric line 200 via a fuse 44 to the thumb switch 20 attached to the hand grip 18 mounted on the hydraulic cylinder 23. When activated, the thumb switch 20 sends an electrical current via wire 201 or 202 to open ports in the electric valve 22 to direct hydraulic fluid through either hose 108 or 109 to retract or extend the cylinder 23. The electrical circuit is made compete by a ground wire 300 attached to the side of the electric valve 22 to which a jumper wire 301 is attached to complete the circuit for wire 201 or 202 as they are individually energized by the thumb switch 20.

The herein described three point hitch obviates the need for an intermediate hitch device to aid in hitching up misaligned implements. This invention also permits a single person to hitch up implements previously requiring two persons. By using this invention a lone operator is able to hitch up an implement without dismounting from the tractor operator seat.

While specific embodiments of the invention have been shown and described, it will be understood, of course, that the invention is not limited thereto since modifications may be made and other embodiments of the principles of this invention will occur to those skilled in the art to which this invention pertains. Therefore, it is contemplated by the appended claims to cover any such modifications and other embodiments, the features of this invention as incorporate, within the true spirit and scope of the following claims.

What is claimed is:

1. A three point hitch apparatus for connecting one of the forward and rearward ends of a tractor to an implement of the type having an upper hitch pin and a pair of laterally spaced lower hitch pins studs, said hitch apparatus comprising:
    a pair laterally spaced lower arms extending in a fore and aft direction relative to said tractor having first corresponding ends pivotally connected to said tractor and second corresponding ends adapted for connection to said lower hitch pins of said implement, each of said second corresponding ends of said lower arms presenting and an upwardly open jaw,
    a shiftable locking shaft reciprocably mounted on said second end of each of said lower arms and
    a pair of extensible and contractible hydraulic actuators mounted, respectively, on said pair of lower arms and connected, respectively, to said shafts whereby extension of said hydraulic actuators shifts said locking shafts to a position in which said lower hitch pins are locked in said jaws when said lower hitch pins are positioned in said jaws and
  an upper arm having one end pivotally connected to said one end of said tractor at a location above the connection of said lower arms to said one end of said tractor and a second end adapted for pivotal connection to said upper hitch pin of said implement.

2. The hitch apparatus as set forth in claim 1 having an extensible and contractible hydraulic cylinder actuator interconnected between said tractor and one of said lower arms, said hydraulic cylinder actuator being operative when actuated to swing said one lower arm laterally about its pivot connection to said tractor.

3. The hitch apparatus as set forth in claim 2 wherein said tractor includes an operator's station and further comprising control valve means for controlling extension and retraction of said hydraulic actuators and said hydraulic cylinder actuator and a manual control adjacent said operator station for operating said control valve means.

4. A three point hitch apparatus for releasably connecting one of the forward and rearward ends of a tractor to an implement of the type having an upper hitch pin and a pair of laterally spaced lower hitch pins, said hitch apparatus comprising:
    a pair of laterally spaced lower arms extending in a fore and aft direction relative to said tractor having first corresponding ends pivotally connected to said tractor and second corresponding ends adapted for connection to said lower hitch pins of said implement,
    lift means on said tractor for raising and lowering said lower arms,
    a hydraulically extensible and contractible upper arm including a linear hydraulic actuator spaced above said lower arms and extending in a fore and aft direction relative to said tractor, said upper arm having one of its front and rear ends pivotably connected to said tractor and having
        a downwardly open fixed upper jaw on the other of said front and rear ends,
        a pivotable jaw pivotably connected to said other end of said upper arm pivotable between an unlatched position in which said pivotable jaw is in a downwardly open position permitting reception of said upper pin of said implement when said other end of said upper arm is lowered and a latched position when said upper arm is lowered further whereby said upper and moveable jaws pivotably connect said upper arm to said upper pin,
        a spring biased latching mechanism on said other end of said upper arm releasably locking said pivotable jaw in said latched position and
        a hand operated release for said latching mechanism on said other end of said upper arm including a release handle,
    a hand grip fixedly secured to said upper arm and
    a control for effecting extension and contraction of said linear hydraulic actuator including
        an electrically controlled hydraulic valve and
        a thumb switch connected in controlling relation to said hydraulic valve, said thumb switch being mounted on said upper arm,
    said hand operated release handle and said hand grip being gripable by a single human hand and said thumb switch being positioned to permit its selective operation by the thumb of said single human hand while gripping said release handle and said hand grip.

5. The hitch apparatus as set forth in claim 4 wherein said linear hydraulic actuator includes a rod component pivotally connected to said tractor and a cylinder component on which said jaws, said hand grip, said latching mechanism, said hand operated release, and said thumb switch are mounted.

6. The hitch apparatus as set forth in claim 4 wherein said tractor includes an operator's station and wherein said hand grip, said release handle and said thumb switch are engageable by one hand of an operator occupying said operator's station.

7. The hitch apparatus as set forth in claim 4 wherein said thumb switch is mounted on said hand grip.

8. The hitch apparatus as set forth in claim 4 wherein said pivotable jaw includes a locking notch, wherein said latch release mechanism includes a locking lever extending in a fore and aft direction and pivotably mounted on said fixed upperjaw by a transverse pivot pin and a latching block on one end of said lever engageable with said notch when said pivotable jaw is pivoted to its latched position, said release handle being pivotably mounted on said upper arm and including a portion engageable with the other end of said lever.

9. A three point hitch apparatus for connecting a tractor to an implement of the type having an upper horizontally disposed hitch pin and a pair of lower laterally spaced and horizontally hitch pins, said hitch apparatus comprising:

a pair laterally spaced lower arms extending in a fore and aft direction relative to said tractor having first corresponding ends pivotally connected to said tractor and second corresponding ends adapted for connection to said lower hitch pins of said implement, each of said second corresponding ends of said lower arms presenting an upwardly open jaw, a shiftable locking shaft reciprocably mounted on said second end of each of said lower arms and a pair of extensible and contractible hydraulic actuators mounted, respectively, on said pair of lower arms and connected, respectively, to said shafts whereby extension of said hydraulic actuators shifts and locking shafts to a position in which said lower hitch pins are locked in said jaws when said lower hitch pins are positioned in said jaws lift means on said tractor for raising and lowering said second ends of said lower arms an upper arm having one end pivotally connected to said one end of said tractor at a location above the connection of said lower arms to said tractor and the other of its ends being adapted for pivotal connection to said upper hitch, pin of said implement, said upper arm including a linear hydraulic actuator spaced above said lower arms and extending in a fore and aft direction relative to said tractor, said upper arm having a downwardly open fixed upper jaw on its other end a pivotable jaw pivotably connected to said other end of said upper arm pivotable between an unlatched position in which said pivotable jaw is in a downwardly open position permitting reception of said upper pin of said implement when said other end of said upper arm is lowered and a latched position when said upper arm is lowered further whereby said upper and moveable jaws pivotably connect said upper arm to said upper pin, a spring biased latching mechanism on said other end of said upper arm releasably locking said pivotable jaw in said latched position and a hand operated release for said latching mechanism on said other end of said upper arm including a release handle, a hand grip fixedly secured to said upper arm and a control for effecting extension and contraction of said linear hydraulic actuator including and electrically controlled hydraulic valve and a thumb switch connected in controlling relation to said hydraulic valve, said thumb switch being mounted on said upper arm, said hand operated release handle and aid hand grip being gripable by a single human hand and said thumb switch being positioned to permit its selective operation by the thumb of said single human hand while gripping said release handle and said hand grip.

\* \* \* \* \*